(12) United States Patent
Wang et al.

(10) Patent No.: US 12,198,079 B2
(45) Date of Patent: Jan. 14, 2025

(54) CONTRIBUTION IDENTIFICATION METHOD FOR NOISE AT BOUNDARY OF URBAN SUBSTATION

(71) Applicants: State Grid Henan Electric Power Research Institute, Henan (CN); State Grid Corporation of China, Beijing (CN)

(72) Inventors: Donghui Wang, Henan (CN); Guangzhou Wang, Henan (CN); Leilei Wang, Henan (CN); Songyang Zhang, Henan (CN); Zhuangzhuang Zhang, Henan (CN); Jiaqi Zhang, Beijing (CN); Rui Li, Beijing (CN); Lin Lu, Beijing (CN); Dong Wang, Henan (CN); Han Xiao, Henan (CN); Degui Yao, Henan (CN)

(73) Assignees: State Grid Henan Electric Power Research Institute, Zhengzhou (CN); State Grid Corporation of China, Beijing (CN)

(*) Notice: Subject to any disclaimer, the term of this patent is extended or adjusted under 35 U.S.C. 154(b) by 391 days.

(21) Appl. No.: 17/894,185

(22) Filed: Aug. 24, 2022

(65) Prior Publication Data
US 2022/0405655 A1 Dec. 22, 2022

Related U.S. Application Data

(63) Continuation-in-part of application No. PCT/CN2022/080901, filed on Mar. 15, 2022.

(30) Foreign Application Priority Data

May 25, 2021 (CN) .......................... 202110572766.7

(51) Int. Cl.
*G06Q 10/04* (2023.01)
*G06Q 50/06* (2024.01)

(52) U.S. Cl.
CPC ............. *G06Q 10/04* (2013.01); *G06Q 50/06* (2013.01)

(58) Field of Classification Search
CPC .............................. G06Q 10/04; G06Q 50/06
See application file for complete search history.

(56) References Cited

FOREIGN PATENT DOCUMENTS

| CN | 107180273 B | | 5/2020 | |
|---|---|---|---|---|
| CN | 112489966 A | * | 3/2021 | ............. G06F 30/23 |
| CN | 113916357 A | * | 1/2022 | ............. G01H 17/00 |
| CN | 114152824 A | * | 3/2022 | ............. G01H 17/00 |

* cited by examiner

Primary Examiner — Manuel L Barbee

(57) ABSTRACT

A contribution identification method for noise at a boundary of an urban substation in the present disclosure includes the following steps: describing site elements and surrounding environmental elements of an urban substation; measuring and recording a background noise value at each boundary of the urban substation; determining an orientation of a specific sound source of the urban substation, and setting a corresponding measurement point at each boundary of the urban substation; obtaining a spectrum of each specific sound source; analyzing a contribution of each intra-substation sound source of the urban substation to noise at the boundary of the substation; analyzing a noise level of each sound source measurement point in the urban substation; recording measured data during noise measurement, and correcting a noise measurement result; and generating a test report.

5 Claims, 1 Drawing Sheet

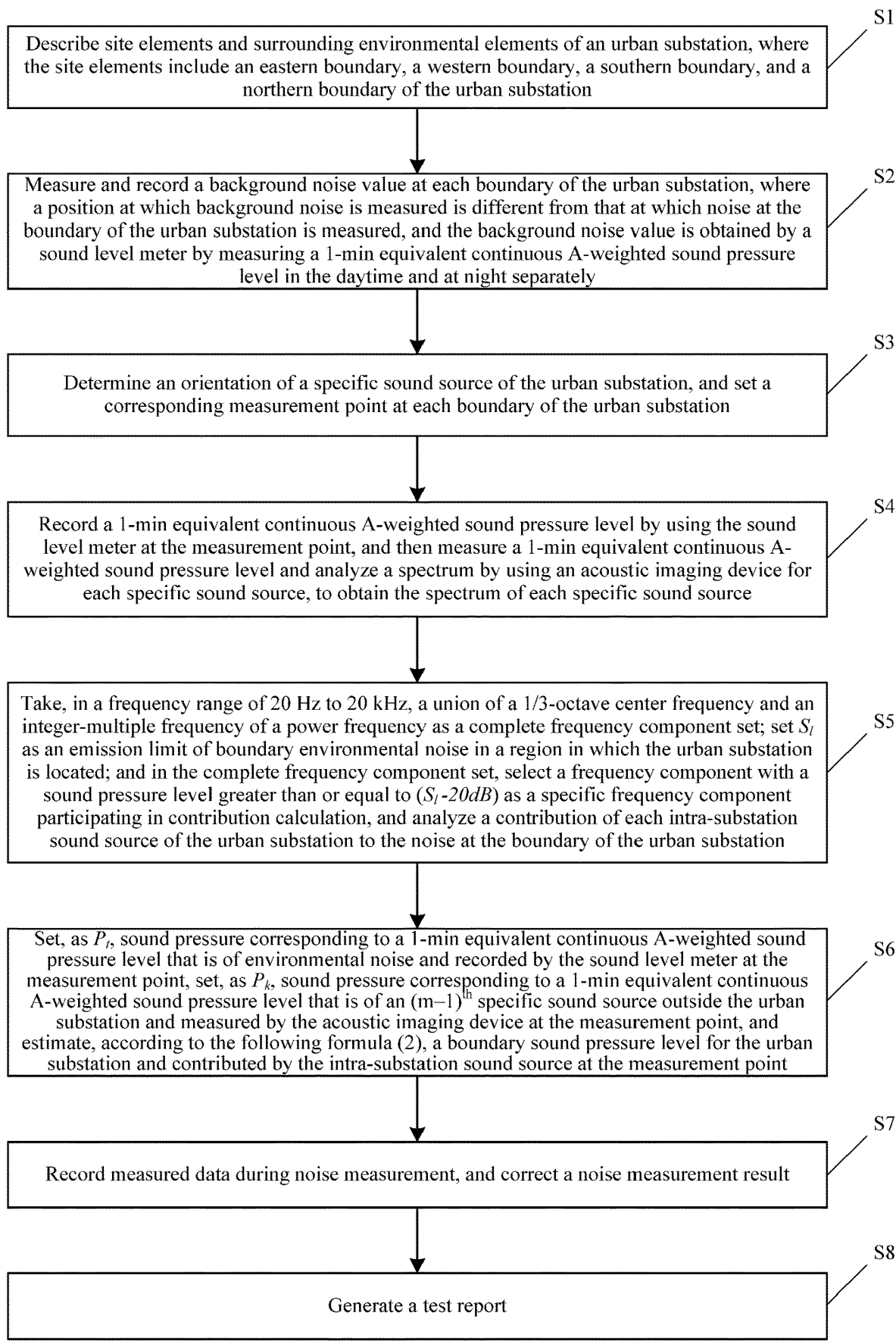

CONTRIBUTION IDENTIFICATION METHOD FOR NOISE AT BOUNDARY OF URBAN SUBSTATION

CROSS REFERENCE TO RELATED APPLICATIONS

The present application is a Continuation-In-Part Application of PCT Application No. PCT/CN2022/080901 filed on Mar. 15, 2022, which claims the benefit of Chinese Patent Application No. 202110572766.7 filed on May 25, 2021. All the above are hereby incorporated by reference in their entirety.

TECHNICAL FIELD

The present disclosure relates to the technical field of online environment monitoring of a substation, and in particular, to a contribution identification method for noise at a boundary of an urban substation.

BACKGROUND

The patent CN107180273B discloses a method for predicting and evaluating noise at a boundary of a substation through statistical analysis based on big data. In the method, core factors affecting noise at a boundary of a substation are obtained by collecting information of main devices of the substation and performing statistical analysis based on big data. A noise evaluation model is built in an evaluation system to send data of a newly-built/to-be-tested substation to the evaluation system for analysis, and a fuzzy evaluation method is used to predict and evaluate the noise at the boundary of the substation, so as to provide reference for construction or reconstruction of the substation. The substation has highly-centralized high-voltage electrical equipment, with a relatively complex electromagnetic environment and acoustic environment. It is difficult to accurately analyze impact of the noise at the boundary of the substation based on the big data, making it difficult to provide a basis for accurate noise control of some in-service substations.

SUMMARY

In order to overcome the above defects, the present disclosure is intended to provide a contribution identification method for noise at a boundary of an urban substation, to identify a contribution of environmental noise at a boundary of a substation, and provide a basis for accurate noise control of an in-service substation.

In order to achieve the aforementioned objective, the present disclosure provides a contribution identification method for noise at a boundary of an urban substation, including the following steps:

S1: describing site elements and surrounding environmental elements of an urban substation, where the site elements include an eastern boundary, a western boundary, a southern boundary, and a northern boundary of the urban substation;

S2: measuring and recording a background noise value at each boundary of the urban substation, where a position at which background noise is measured is different from that at which noise at the boundary of the urban substation is measured, and the background noise value is obtained by a sound level meter by measuring a 1-min equivalent continuous A-weighted sound pressure level in the daytime and at night separately;

S3: determining an orientation of a specific sound source of the urban substation, and setting a corresponding measurement point at each boundary of the urban substation;

S4: recording a 1-min equivalent continuous A-weighted sound pressure level by using the sound level meter at the measurement point, and then measuring a 1-min equivalent continuous A-weighted sound pressure level and analyzing a spectrum by using an acoustic imaging device for each specific sound source, to obtain the spectrum of each specific sound source;

S5: taking, in a frequency range of 20 Hz to 20 kHz, a union of a ⅓-octave center frequency and an integer-multiple frequency of a power frequency as a complete frequency component set; setting $S_l$ as an emission limit of boundary environmental noise in a region in which the urban substation is located; and in the complete frequency component set, selecting a frequency component with a sound pressure level greater than or equal to ($S_l$–20 dB) as a specific frequency component participating in contribution calculation, and analyzing a contribution of each intra-substation sound source of the urban substation to the noise at the boundary of the urban substation, where a contribution $C_1$ of an intra-substation sound source $S_1$ to the noise at the boundary of the urban substation is calculated according to the following formula (1):

$$C_1 = \frac{\sum_{j=1}^{n} a_{1j}^2}{\sum_{i=1}^{m}\sum_{j=1}^{n} a_{ij}^2} \tag{1}$$

where $a_{1j}$ represents a $j^{th}$ specific frequency component in n frequency components of the intra-substation sound source $S_1$, and $a_{ij}$ represents a $j^{th}$ specific frequency component of an $i^{th}$ specific sound source in m specific sound sources;

S6: setting, as $p_t$, sound pressure corresponding to a 1-min equivalent continuous A-weighted sound pressure level that is of environmental noise and recorded by the sound level meter at the measurement point, setting, as $p_k$, sound pressure corresponding to a 1-min equivalent continuous A-weighted sound pressure level that is of an $(m-1)^{th}$ specific sound source outside the urban substation and measured by the acoustic imaging device at the measurement point, and estimating, according to the following formula (2), a boundary sound pressure level for the urban substation and contributed by the intra-substation sound source at the measurement point:

$$SPL_1 = 10 \cdot lg\left(\frac{p_t^2 - \sum_{k=2}^{m} p_k^2}{p_{ref}^2}\right) \tag{2}$$

where $p_{ref}$ represents reference sound pressure;

S7: recording measured data during noise measurement, and correcting a noise measurement result; and S8: generating a test report.

Optionally, the describing site elements and surrounding environmental elements of an urban substation specifically includes:

performing patrol in the urban substation and at the boundary of the urban substation, completing the description of the site elements and the surrounding environmental elements of the urban substation, and making a record, where objects recorded in the description process include a boundary outline of the urban substation and a length, a height, and a category of each boundary of the urban substation; a position of an audible noise source and an installation status of a sound absorption facility and a sound barrier in the urban substation; a category of an acoustic environment function zone in which the urban substation is located; positions and distances of the boundary of the urban substation relative to a surrounding traffic artery and a surrounding building; a type of the surrounding traffic artery of the urban substation; a floor quantity, a height, a purpose, and a facade material of the surrounding building of the urban substation; directions, a quantity, and categories of potential specific sound sources; a quantity and categories of noise-sensitive buildings around the urban substation and distances between the noise-sensitive buildings and the boundary of the urban substation; whether there is specific sound generated or specific sound induced and corresponding initial sound, fluctuated sound, intermittent sound or residual sound; and recommended measurement positions of the background noise and the noise at the boundary of the urban substation.

Optionally, the determining an orientation of a specific sound source of the urban substation, and setting a corresponding measurement point at each boundary of the urban substation specifically includes:

scanning, outside each boundary of the urban substation, each direction, a direction of a potential specific sound source, by using the acoustic imaging device, to determine positions and a quantity of specific sound sources contributing to the noise at the boundary of the urban substation; and setting the corresponding measurement point at each boundary of the urban substation, where the measurement point at each boundary of the urban substation is located 1 m outside the boundary of the urban substation, with a height of more than 1.2 m and a distance of no less than 1 m from any reflecting surface; when there is a fence at any boundary of the urban substation and there is an affected noise-sensitive building, the measurement point is located 1 m outside the boundary of the urban substation and more than 0.5 m above the fence; and when actual emission of the intra-substation sound source cannot be measured at any boundary of the urban substation, another measurement point is set at a position that is located 1 m outside the affected noise-sensitive building and at which the acoustic imaging device can be used to directly image a specific sound source outside the boundary of the urban substation.

Optionally, the measured data includes a name, a category, and an operation and maintenance unit of the urban substation; a geographical position, an altitude, an acoustic environment function zone category, and a surrounding acoustic environmental element of the urban substation; a schematic diagram of positions of the urban substation relative to a surrounding facility and the measurement point; meteorological conditions in a measurement time period; names, categories, and calibration time of measurement instruments and calibration instruments; measurement time, a measurement time period, and instrument calibration values before and after the measurement; the background noise value, a measured noise value at the measurement point, and an acoustic imaging graphic and a corresponding spectrum of each specific sound source at the measurement point; and information of measurement, proofreading, and audit personnel.

Optionally, the test report includes: a date; an instrument and its calibration status; climatic conditions, including a wind speed, a wind direction, temperature, air pressure, humidity, and a weather condition; working conditions, including a voltage, a current, and power of an intra-substation sound source device; a measurement time period; a measurement correction status; measured and corrected equivalent continuous A-weighted sound pressure levels; other situations that need to be explained; a schematic diagram of a surrounding acoustic environment of the urban substation and a position of a corresponding measurement point; a measured noise value at the measurement point at the boundary of the urban substation; and a type of a fence at the boundary of the urban substation, and an arrangement status of a sound absorption facility and a sound barrier.

A single-point short-time test system is used to monitor noise at boundaries of most substations. Monitoring data obtained by the system needs to be collected and counted manually to obtain a long-term multi-point data statistical table. Due to interference from the background noise and an inability to realize simultaneous multi-point measurement, work intensity of surveyors increases, and the monitoring data is of poor reliability and accuracy.

Operation characteristics of the substation determine that the background noise of the substation cannot be monitored by shutting down a device. In a power system with a rated frequency of 50 Hz, a characteristic spectrum of a noise source of the substation is mainly concentrated at 100 Hz and an integer multiple of 100 Hz, which is obviously different from a spectrum of common background noise. Therefore, spectrum characteristics of a noise source and noise at each point of the boundary of the substation are monitored at the same time, to determine whether noise higher than an acceptable level at each boundary of the substation is caused by an intra-station noise source of the substation, so as to better reduce interference of the background noise to the measurement result and improve accuracy of the measurement.

The present disclosure has the following beneficial effects: The present disclosure is applicable to identification of a contribution of environmental noise at a boundary of an AC substation with a voltage class of 110 kV or above when the substation is affected by a plurality of surrounding audible noise sources. The site and surrounding environmental elements of the urban substation are described, the spectrum characteristics of the noise source and the noise at each point of the boundary of the urban substation are monitored, recorded, analyzed, and corrected, and the intuitive test report is prepared, so as to identify whether the noise higher than the acceptable level at each boundary of the substation is caused by the intra-station noise source of the substation. This better reduces the interference of the background noise to the measurement result, improve the efficiency and accuracy of the measurement, and provide a basis for accurate noise control of an in-service substation.

BRIEF DESCRIPTION OF THE DRAWINGS

The sole FIGURE is a flowchart of a contribution identification method for noise at a boundary of an urban substation according to a preferred embodiment of the present disclosure.

DETAILED DESCRIPTION

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

The embodiments of the present disclosure provide a contribution identification method for noise at a boundary of an urban substation. The sole FIGURE is a flowchart of a contribution identification method for noise at a boundary of an urban substation according to a preferred embodiment of the present disclosure. The method includes steps S1 to S8.

S1: Describe site elements and surrounding environmental elements of an urban substation, where the site elements include an eastern boundary, a western boundary, a southern boundary, and a northern boundary of the urban substation.

It should be noted that the urban substation is a high-voltage AC substation located within a scope of urban construction land; and the boundary is a boundary of a place or building whose use right (or ownership) is possessed by an owner determined in legal documents (such as a land use certificate, a property ownership certificate, and a lease contract), and a boundary of each fixed device producing noise is a boundary of land actually occupied by the fixed device.

S2: Measure and record a background noise value at each boundary of the urban substation, where a position at which background noise is measured is different from that at which noise at the boundary of the urban substation is measured, and the background noise value is obtained by a sound level meter by measuring a 1-min equivalent continuous A-weighted sound pressure level in the daytime and at night separately.

It should be noted that the background noise is a sum of environmental noise emitted by sound sources other than a measured noise source. The background noise value needs to be measured and recorded at each boundary (for example, the eastern boundary, the western boundary, the southern boundary, and the northern boundary) of the urban substation as a correction basis for a measured value of the noise at the corresponding boundary of the urban substation. The position at which the background noise is measured may be different from that at which the noise at the boundary of the urban substation is measured, but acoustic environments at the two positions are similar. For example, the background noise value may be obtained by the sound level meter by measuring the 1-min equivalent continuous A-weighted sound pressure level at the measurement position of the background noise in the daytime and at night separately.

The sound level meter is a kind of noise measurement instrument, which needs to comply with the specifications on the sound level meter in measurement instruments in 5.1.1 of GB 12348-2008. The instrument needs to have a function of analyzing a noise spectrum at a ⅓ octave center frequency and an integer-multiple frequency of a power frequency (50 Hz or 60 Hz) in a frequency range of 20 Hz to 20 kHz. During spectrum analysis, performance of the instrument needs to meet a requirement for a filter in GB/T 3241. For example, a type-1 sound level meter needs to be used to measure noise below 35 dB, and a measurement range needs to meet needs of the measured noise.

The daytime generally is a time period from 6:00 to 22:00, and the night generally is a time period from 22:00 to 6:00 on the next day. The time periods corresponding to the daytime and the night may alternatively be specified based on needs of environmental noise pollution prevention and control.

An equivalent continuous A-weighted sound pressure level is an average energy value of A-weighted sound pressure levels within specified measurement time, and the A-weighted sound pressure level is obtained through A-weighting. For example, the equivalent continuous A-weighted sound pressure level is 10 times a denary logarithm of a ratio of a square of root mean square sound pressure to a square of reference sound pressure within a certain time interval (for example, 1 min).

S3: Determine an orientation of a specific sound source of the urban substation, and set a corresponding measurement point at each boundary of the urban substation.

It should be noted that the specific sound source is a sound source that can be clearly determined and contributes to a total sound and environmental noise. The total sound is all sound contained in a certain time period and under a certain condition, which is usually composed of sound from various far and near sound sources. The environmental noise is sound generated by a fixed device in production and living activities that interferes with surrounding production and living environments.

S4: Record a 1-min equivalent continuous A-weighted sound pressure level by using the sound level meter at the measurement point, and then measure a 1-min equivalent continuous A-weighted sound pressure level and analyze a spectrum by using an acoustic imaging device for each specific sound source, to obtain the spectrum of each specific sound source.

It should be noted that the acoustic imaging device is also a kind of measurement instrument, specifically, is an acoustic measurement and analysis device that can superpose sound field distribution cloud atlases through geometric registration based on an image obtained through optical imaging.

S5: Take, in the frequency range of 20 Hz to 20 kHz, a union of the ⅓-octave center frequency and the integer-multiple frequency of the power frequency as a complete frequency component set; set $S_l$ as an emission limit of boundary environmental noise in a region in which the urban substation is located; and in the complete frequency component set, select a frequency component with a sound pressure level greater than or equal to ($S_l$–20 dB) as a specific frequency component participating in contribution calculation, and analyze a contribution of each intra-substation sound source of the urban substation to the noise at the boundary of the urban substation, where a contribution $C_1$ of an intra-substation sound source $S_1$ to the noise at the boundary of the urban substation is calculated according to the following formula (1):

$$C_1 = \frac{\sum_{j=1}^{n} a_{1j}^2}{\sum_{i=1}^{m}\sum_{j=1}^{n} a_{ij}^2} \quad (1)$$

where $a_{1j}$ represents a $j^{th}$ specific frequency component in n frequency components of the intra-substation sound source $S_1$, and $a_{ij}$ represents a $j^{th}$ specific frequency component of an $i^{th}$ specific sound source in m specific sound sources.

It should be noted that step S5 is a step of analyzing the contribution of the intra-substation sound source. The specific frequency component in the spectrum of the specific sound source can be extracted according to the selection principle in step S5, so as to complete the analysis of the contribution of the intra-substation sound source based on the determined specific frequency component and the formula (1).

S6: Set, as $p_t$, sound pressure corresponding to a 1-min equivalent continuous A-weighted sound pressure level that is of environmental noise and recorded by the sound level meter at the measurement point, set, as $p_k$, sound pressure corresponding to a 1-min equivalent continuous A-weighted sound pressure level that is of an $(m-1)^{th}$ specific sound source outside the urban substation and measured by the acoustic imaging device at the measurement point, and estimate, according to the following formula (2), a boundary sound pressure level for the urban substation and contributed by the intra-substation sound source at the measurement point:

$$SPL_1 = 10 \cdot lg\left(\frac{p_t^2 - \sum_{k=2}^{m} p_k^2}{p_{ref}^2}\right) \quad (2)$$

where $p_{ref}$ represents the reference sound pressure.

It should be noted that step S6 is a step of analyzing a noise level of the intra-substation sound source. The boundary sound pressure level for the urban substation and contributed by the intra-substation sound source at the measurement point can be estimated according to the formula (2). $p_{ref}$ in the formula 2 represents the reference sound pressure, and $p_{ref}$=20 µPa.

S7: Record measured data during noise measurement, and correct a noise measurement result.

S8: Generate a test report.

It should be additionally noted that in addition to the sound level meter and the acoustic imaging device, the measurement instrument also includes a microphone.

a) If the sound level meter adopts a structure in which the microphone is separated from a body of the sound level meter, the microphone of the sound level meter needs to meet the following requirements:

A microphone with a diameter of 1.25 cm is recommended. When sensitivity of this type of microphone at a specific measurement point is insufficient, a same-type microphone with a diameter of 2.5 cm can be used.

b) A micro electromechanical system (MEMS) microphone can be used in a microphone array of the acoustic imaging device.

c) In order to reduce wind noise and prevent wind and dust, the microphone may be equipped with a wind shield, but an insertion loss of the wind shield shall not exceed 2 dB.

In the above identification process, the following specific measurement requirements need to be met:

(1) The measurement needs to be carried out in the absence of rain, snow, and lightning and when a wind speed is lower than 5 m/s, and needs to be suspended in the case of rain, snow, or lightning or when the wind speed is higher than 5 m/s.

(2) Measurement and calibration instruments need to be qualified through regular verification and used within a verification validity period. During the measurement, the microphone needs to be equipped with the wind shield, acoustic calibration needs to be carried out at a measurement site before and after the measurement, and a deviation between indicating values before and after the acoustic calibration shall not be greater than 0.5 dB(A). A time weighting characteristic of the measurement instrument needs to be set to a gear "F", and a sampling interval shall not be greater than 1 s.

(3) During the measurement, the microphone in the measurement instrument needs to be more than 1.2 m above the ground, and the microphone and the microphone array need to be aligned with a direction of the noise source to obtain a maximum value. The measurement instrument needs to be fixed on a special support, and a height of the microphone from the ground needs to remain unchanged. During operation of the instrument, a distance between measurement personnel and the microphone needs to be greater than 0.5 m.

(4) When the sound level meter is used for measurement, it is recommended to use a measured 1-m equivalent continuous A-weighted sound pressure level in units of dB(A) for the measurement point uniformly. At least three measurements need to be carried out for each measurement point, and a measurement interval shall not be greater than 5 min.

(5) When the acoustic imaging device is used for contribution identification and analysis, an acoustic imaging result of each specific sound source needs to be characterized by the equivalent continuous A-weighted sound pressure level, in units of dB(A). Dynamic imaging needs to be carried out for each specific sound source for at least three times, and a measurement interval shall not be greater than 5 min.

(6) A distribution frequency of a noise spectrum diagram needs to cover the frequency range of 20 Hz to 20 kHz, and a corresponding spectrum needs to be the union of the ⅓ octave center frequency and the integer-multiple frequency of the power frequency.

(7) The identification needs to be carried out during normal operation of the urban substation, and an operation condition of an intra-substation sound source device in the identification process need to be indicated. The intra-substation sound source device may be power equipment or cooling equipment that produces audible noise within the boundary of the urban substation, such as a transformer, a reactor, or a fan.

The contribution identification method for noise at a boundary of an urban substation provided in this embodiment of the present disclosure is applicable to identification of a contribution of environmental noise at a boundary of an AC substation with a voltage class of 110 kV or above when the substation is affected by a plurality of surrounding audible noise sources. The site and surrounding environmental elements of the urban substation are described, spectrum characteristics of a noise source and noise at each point of the boundary of the urban substation are monitored, recorded, analyzed, and corrected, and the intuitive test report is prepared, so as to identify whether noise higher than an acceptable level at each boundary of the substation is caused by the intra-station noise source of the substation. This better reduces interference of the background noise to the measurement result, improve efficiency and accuracy of the measurement, and provide a basis for accurate noise control of an in-service substation.

As an improvement of the above solution, the describing site elements and surrounding environmental elements of an urban substation specifically includes:

performing patrol in the urban substation and at the boundary of the urban substation, completing the description of the site elements and the surrounding environmental elements of the urban substation, and making a record, where objects recorded in the description process include a boundary outline of the urban substation and a length, a height, and a category of each boundary of the urban substation; a position of an audible noise source and an installation status of a sound absorption facility and a sound barrier in the urban substation; a category of an acoustic environment function zone in which the urban substation is located; positions and distances of the boundary of the urban substation relative to a surrounding traffic artery and a surrounding building; a type of the surrounding traffic artery of the urban substation; a floor quantity, a height, a purpose, and a facade material of the surrounding building of the urban substation; directions, a quantity, and categories of potential specific sound sources; a quantity and categories of noise-sensitive buildings around the urban substation and distances between the noise-sensitive buildings and the boundary of the urban substation; whether there is specific sound generated or specific sound induced and corresponding initial sound, fluctuated sound, intermittent sound or residual sound; and recommended measurement positions of the background noise and the noise at the boundary of the urban substation.

It should be noted that the noise-sensitive building is a building that needs to be kept quiet, such as a hospital, a school, an institution, a scientific research institution, or a residential building. The initial sound is total sound under an initial condition before any change occurs. The fluctuated sound is continuous sound with a sound pressure level significantly changed in a non-pulse form in a monitoring period. The intermittent sound is sound monitored only in a specific time at a fixed or unfixed time interval, and its minimum duration is about more than 5 s. The residual sound is total sound remaining at a specific position under a given condition when specific sound is suppressed. The specific sound is sound emitted by the specific sound source and belonging to the total sound and the environmental noise.

By describing and recording the site elements and the surrounding environmental elements of the urban substation, this embodiment of the present disclosure can facilitate subsequent better noise measurement and contribution identification based on the measurement requirements of the identification process.

As an improvement of the above solution, the determining an orientation of a specific sound source of the urban substation, and setting a corresponding measurement point at each boundary of the urban substation specifically includes:

scanning, outside each boundary of the urban substation, each direction, a direction of a potential specific sound source, by using the acoustic imaging device, to determine positions and a quantity of specific sound sources contributing to the noise at the boundary of the urban substation; and setting the corresponding measurement point at each boundary of the urban substation, where the measurement point at each boundary of the urban substation is located 1 m outside the boundary of the urban substation, with a height of more than 1.2 m and a distance of no less than 1 m from any reflecting surface; when there is a fence at any boundary of the urban substation and there is an affected noise-sensitive building, the measurement point is located 1 m outside the boundary of the urban substation and more than 0.5 m above the fence; and when actual emission of the intra-substation sound source cannot be measured at any boundary of the urban substation, another measurement point is set at a position that is located 1 m outside the affected noise-sensitive building and at which the acoustic imaging device can be used to directly image a specific sound source outside the boundary of the urban substation.

It should be noted that based on a sound source of an industrial enterprise, a layout of a surrounding noise-sensitive building, and a category of an adjacent region, a plurality of measurement points can be arranged at a boundary of the industrial enterprise, including a position close to the noise-sensitive building and a position greatly affected by the measured sound source.

Generally, the measurement point is located 1 m outside the boundary, with a height of more than 1.2 m and a distance of no less than 1 m from any reflecting surface; when there is a fence at a boundary and there is an affected noise-sensitive building, the measurement point is located 1 m outside the boundary and more than 0.5 m above the fence; and when actual emission of a sound source cannot be measured at the boundary (for example, the sound source is located at a high altitude, and the sound barrier is disposed at the boundary), the measurement point is located 1 m outside the affected noise-sensitive building based on the above general requirements. During indoor noise measurement, an indoor measurement point is located 1.2 m above the ground, with a distance of at least 0.5 m from any reflecting surface. The measurement needs to be carried out when a window in a direction affected by noise is open, and a fixed device structure transmits sound to the interior of the noise-sensitive building. During measurement inside the noise-sensitive building, a measurement point needs to be located 1.2 m above the ground and 1 m away from an external window, with a distance of at least 0.5 m from any reflecting surface, and the measurement needs to be carried out when the window is closed. Other sound sources that may interfere with the measurement (such as a TV, an air conditioner, an exhaust fan, a fluorescent lamp with a loud ballast, and a clock with sound during operation) in a tested room need to be turned off.

As an improvement of the above solution, the measured data includes a name, a category, and an operation and maintenance unit of the urban substation; a geographical position, an altitude, an acoustic environment function zone category, and a surrounding acoustic environmental element of the urban substation; a schematic diagram of positions of the urban substation relative to a surrounding facility and the measurement point; meteorological conditions in a measurement time period; names, categories, and calibration time of measurement instruments and calibration instruments; measurement time, a measurement time period, and instrument calibration values before and after the measurement; the background noise value, a measured noise value at the measurement point, and an acoustic imaging graphic and a corresponding spectrum of each specific sound source at the measurement point; and information of measurement, proofreading, and audit personnel.

The calibration instrument needs to meet a requirement for a level-1 or level-2 acoustic calibrator in GB/T15173.

It should be noted that a measurement record needs to be made during noise measurement, which mainly includes the above measured data. In addition, on a basis of measuring corresponding background noise of each boundary of the urban substation in combination with an environment of the boundary of the urban substation, relevant provisions in the technical specification for environmental noise monitoring are followed to correct the measured noise value. 1) When a difference between the measured noise value and the background noise value is greater than 10 dB(A), the measured noise value is not corrected. 2) When the difference between the measured noise value and the background noise value ranges from 3 dB(A) to 10 dB(A), the measured noise value is corrected based on Table 1-1 after the difference between the measured noise value and the background noise value is rounded. When the difference between the measured noise value and the background noise value is less than 3 dB(A), a measure needs to be taken to reduce the background noise, and then the case 1) or 2) is followed.

TABLE 1-1

| Correction of the measurement result (unit: dB(A)) | | | |
|---|---|---|---|
| Difference | 3 | 4-5 | 6-10 |
| Correction value | −3 | −2 | −1 |

As an improvement of the above solution, the test report includes a date; an instrument and its calibration status; climatic conditions, including a wind speed, a wind direction, temperature, air pressure, humidity, and a weather condition (for example, sunny, overcast, foggy, rainy, snowy, or lightning); working conditions, including a voltage, a current, and power of the intra-substation sound source device; a measurement time period; a measurement correction status; measured and corrected equivalent continuous A-weighted sound pressure levels; other situations that need to be explained; a schematic diagram of a surrounding acoustic environment of the urban substation and a position of a corresponding measurement point; the measured noise value at the measurement point at the boundary of the urban substation; and a type of the fence at the boundary of the urban substation, and an arrangement status of the sound absorption facility and the sound barrier.

It should be noted that the contribution identification report on the noise at the boundary of the urban substation should at least include the above content, so as to quantitatively describe the corresponding contribution identification result.

The above described are preferred embodiments of the present disclosure, and it should be noted that for those of ordinary skill in the art, various improvements and modifications may be made without departing from the principles of the present disclosure. These improvements and modifications should be regarded as falling within the protection scope of the present disclosure.

The invention claimed is:

1. A contribution identification method for noise at a boundary of an urban substation, comprising the following steps:
    S1: describing site elements and surrounding environmental elements of an urban substation, wherein the site elements comprise an eastern boundary, a western boundary, a southern boundary, and a northern boundary of the urban substation;
    S2: measuring and recording a background noise value at each boundary of the urban substation, wherein a position at which background noise is measured is different from that at which noise at the boundary of the urban substation is measured, and the background noise value is obtained by a sound level meter by measuring a 1-min equivalent continuous A-weighted sound pressure level in the daytime and at night separately;
    S3: determining an orientation of a specific sound source of the urban substation, and setting a corresponding measurement point at each boundary of the urban substation;
    S4: recording a 1-min equivalent continuous A-weighted sound pressure level by using the sound level meter at the measurement point, and then measuring a 1-min equivalent continuous A-weighted sound pressure level and analyzing a spectrum by using an acoustic imaging device for each specific sound source, to obtain the spectrum of each specific sound source;
    S5: taking, in a frequency range of 20 Hz to 20 kHz, a union of a ⅓-octave center frequency and an integer-multiple frequency of a power frequency as a complete frequency component set; setting $S_l$ as an emission limit of boundary environmental noise in a region in which the urban substation is located; and in the complete frequency component set, selecting a frequency component with a sound pressure level greater than or equal to ($S_l$−20 dB) as a specific frequency component participating in contribution calculation, and analyzing a contribution of each intra-substation sound source of the urban substation to the noise at the boundary of the urban substation, wherein a contribution $C_1$ of an intra-substation sound source $S_1$ to the noise at the boundary of the substation is calculated according to the following formula (1):

$$C_1 = \frac{\sum_{j=1}^{n} a_{1j}^2}{\sum_{i=1}^{m}\sum_{j=1}^{n} a_{ij}^2} \quad (1)$$

wherein $a_{1,j}$ represents a $j^{th}$ specific frequency component in n frequency components of the intra-substation sound source $S_1$, and $a_{ij}$ represents a $j^{th}$ specific frequency component of an $i^{th}$ specific sound source in m specific sound sources;
    S6: setting, as $p_t$, sound pressure corresponding to a 1-min equivalent continuous A-weighted sound pressure level that is of environmental noise and recorded by the sound level meter at the measurement point, setting, as $p_k$, sound pressure corresponding to a 1-min equivalent continuous A-weighted sound pressure level that is of an $(m-1)^{th}$ specific sound source outside the urban substation and measured by the acoustic imaging device at the measurement point, and estimating, according to the following formula (2), a boundary sound pressure level for the urban substation and contributed by the intra-substation sound source at the measurement point:

$$SPL_1 = 10 \cdot lg\left(\frac{p_t^2 - \sum_{k=2}^{m} p_k^2}{p_{ref}^2}\right) \quad (2)$$

wherein $p_{ref}$ represents reference sound pressure;
    S7: recording measured data during noise measurement, and correcting a noise measurement result; and
    S8: generating a test report.

2. The contribution identification method for noise at a boundary of an urban substation according to claim 1, wherein the describing site elements and surrounding environmental elements of an urban substation specifically comprises:

performing patrol in the urban substation and at the boundary of the urban substation, completing the description of the site elements and the surrounding environmental elements of the urban substation, and making a record, wherein objects recorded in the description process comprise a boundary outline of the urban substation and a length, a height, and a category of each boundary of the urban substation; a position of an audible noise source and an installation status of a sound absorption facility and a sound barrier in the urban substation; a category of an acoustic environment function zone in which the urban substation is located; positions and distances of the boundary of the urban substation relative to a surrounding traffic artery and a surrounding building; a type of the surrounding traffic artery of the urban substation; a floor quantity, a height, a purpose, and a facade material of the surrounding building of the urban substation; directions, a quantity, and categories of potential specific sound sources; a quantity and categories of noise-sensitive buildings around the urban substation and distances between the noise-sensitive buildings and the boundary of the urban substation; whether there is specific sound generated or specific sound induced and corresponding initial sound, fluctuated sound, intermittent sound or residual sound; and recommended measurement positions of the background noise and the noise at the boundary of the urban substation.

3. The contribution identification method for noise at a boundary of an urban substation according to claim 1, wherein the determining an orientation of a specific sound source of the urban substation, and setting a corresponding measurement point at each boundary of the urban substation specifically comprises:

scanning, outside each boundary of the urban substation, each direction, a direction of a potential specific sound source, by using the acoustic imaging device, to determine positions and a quantity of specific sound sources contributing to the noise at the boundary of the urban substation; and setting the corresponding measurement point at each boundary of the urban substation, wherein the measurement point at each boundary of the urban substation is located 1 m outside the boundary of the urban substation, with a height of more than 1.2 m and a distance of no less than 1 m from any reflecting surface; when there is a fence on any boundary of the urban substation and there is an affected noise-sensitive building, the measurement point is located 1 m outside the boundary of the urban substation and more than 0.5 m above the fence; and when actual emission of the intra-substation sound source cannot be measured at any boundary of the urban substation, another measurement point is set at a position that is located 1 m outside the affected noise-sensitive building and at which the acoustic imaging device can be used to directly image a specific sound source outside the boundary of the urban substation.

4. The contribution identification method for noise at a boundary of an urban substation according to claim 1, wherein the measured data comprises a name, a category, and an operation and maintenance unit of the urban substation; a geographical position, an altitude, an acoustic environment function zone category, and a surrounding acoustic environmental element of the urban substation; a schematic diagram of positions of the urban substation relative to a surrounding facility and the measurement point; meteorological conditions in a measurement time period; names, categories, and calibration time of measurement instruments and calibration instruments; measurement time, a measurement time period, and instrument calibration values before and after the measurement; the background noise value, a measured noise value at the measurement point, and an acoustic imaging graphic and a corresponding spectrum of each specific sound source at the measurement point; and information of measurement, proofreading, and audit personnel.

5. The contribution identification method for noise at a boundary of an urban substation according to claim 1, wherein the test report comprises a date; an instrument and its calibration status; climatic conditions, comprising a wind speed, a wind direction, temperature, air pressure, humidity, and a weather condition; working conditions, comprising a voltage, a current, and power of an intra-substation sound source device; a measurement time period; a measurement correction status; measured and corrected equivalent continuous A-weighted sound pressure levels; other situations that need to be explained; a schematic diagram of a surrounding acoustic environment of the urban substation and a position of a corresponding measurement point; a measured noise value at the measurement point at the boundary of the urban substation; and a type of a fence at the boundary of the urban substation, and an arrangement status of a sound absorption facility and a sound barrier.

\* \* \* \* \*